Dec. 19, 1933.　　　　C. A. JACOBSON　　　　1,940,352
PROCESS FOR TREATING POWDERED COAL
Filed Sept. 15, 1931
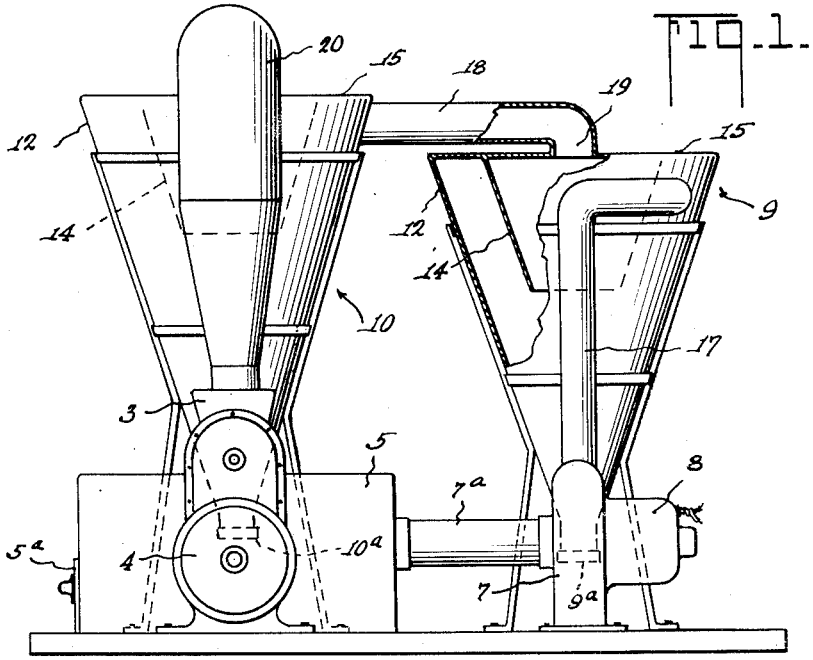
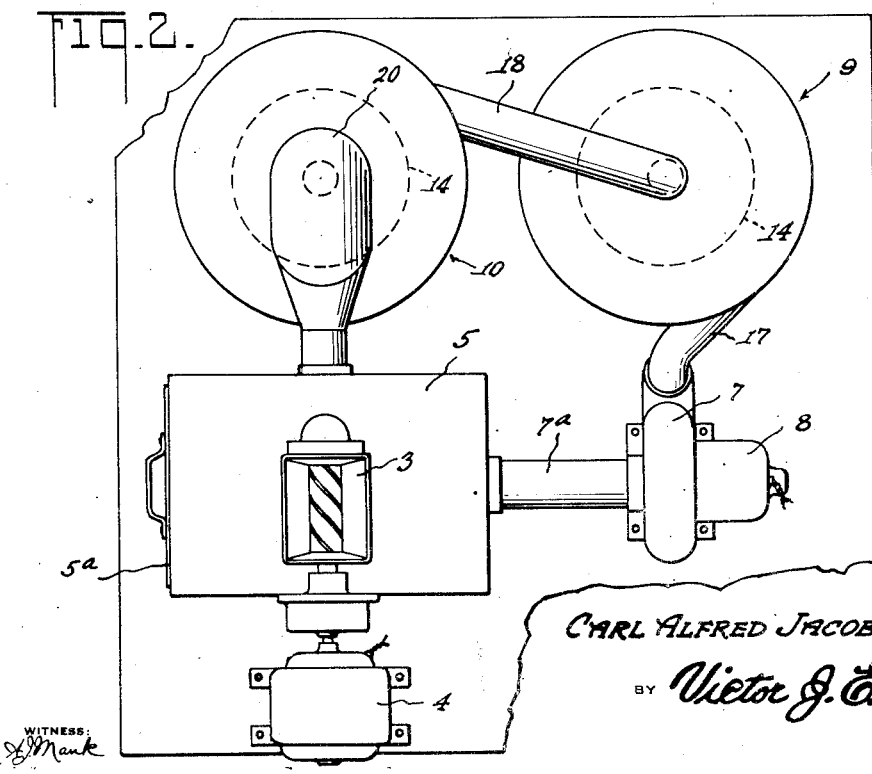
CARL ALFRED JACOBSON
INVENTOR
BY Victor J. Evans
ATTORNEY
WITNESS:

Patented Dec. 19, 1933

1,940,352

UNITED STATES PATENT OFFICE 1,940,352

PROCESS FOR TREATING POWDERED COAL

Carl Alfred Jacobson, Morgantown, W. Va.

Application September 15, 1931
Serial No. 562,953

7 Claims. (Cl. 252—3)

This invention relates to a process and apparatus for treating carbonaceous matter such as bituminous coal for example, and to the products obtained by practicing the process.

The process of my invention may be illustrated as follows. A mixture is made of very finely divided bituminous coal and diatomaceous or infusorial earth. The mixture may consist for example of equal weights of bituminous coal and diatomaceous earth, but it is to be understood that satisfactory results have been obtained with other proportions, of the ingredients.

The mentioned mixture is submitted to destructive distillation for a period of three to four hours at a temperature of from 900° to 1100° centigrade in a retort that excludes air. The products of distillation, may be collected in any suitable manner. I found that when the mentioned mixture is subjected to destructive distillation an increased yield of combustible gases is obtained. The residue in the retort, which I have called silica black, consists partly of a compound of silicon and carbon, together with an indeterminate amount of carbides, oxides, and sulfides of other elements, depending upon the nature both of the diatomaceous earth and the coal. This residual mixture is black in color and is comparatively soft so that it may be easily reduced to powder, being softer than ordinary salt. The analysis of one sample of this silica black was as follows: 69.72% $SiO_2$, 24.97% C. and 5.31% of inorganic oxides etc. containing aluminum, iron, manganese, magnesium, and calcium. The analysis of the product is thus principally $SiO_2$. The carbon content is usually greater than that of non-siliceous inorganic matter.

The residual silica black is preferably disintegrated and separated into three different grades, which may be done in the apparatus shown in the drawing, in which:

Fig. 1 is a front elevation, partly broken away and partly in section, of such apparatus; and Fig. 2 is a plan view of the apparatus shown in Fig. 1.

In the drawing, the numeral 3 indicates a grinding mill operated by an electric motor 4. The material ground by the mill 3 enters a box 5 provided with a drawer 5a, the ground material being taken from the box 5 through a pipe 7a by the action of a blower 7 run by a motor 8 and forced through a pair of air flotation separators 9 and 10, which are in series with each other and with the blower 7 and the box 5. The mentioned separators are similar, each comprising a conical casing 12 within which is disposed a baffle 14 in the form of a truncated cone depending from the top 15 of the casing and spaced from the side wall thereof. A pipe 17 is connected to the blower 7 and is connected tangentially to the casing 12 of the separator 9, it being understood that an opening is cut in the casing just mentioned so that material blown through the pipe 17 enters the separator 9 between the casing and the baffle 14. A pipe 18 rises from the top 15 of the separator 9 and encircles an aperture 19 cut in the top just mentioned. The pipe 18 is tangentially connected to the casing 12 of the separator 10 in the same manner that the pipe 17 is connected with the casing 12 of the separator 9, the mentioned pipes 17 and 18 being tangentially connected to the mentioned casings so that the material entering the separators from the pipes may be given a whirling motion. A pipe 20 of larger diameter than the pipes 17 and 18 rises from the top of the separator 10 in order to diminish the velocity of the air current and give the material more time to settle out in separator 10 and is brought down and connected to the box 5. The open lower ends of the separators 9 and 10 are respectively closed by means of bottoms 9a and 10a, detachably connected to the casings, these bottoms being detachable in order to remove, at intervals, the material deposited in the separators.

The powdered or ground material separated into three different grades, in the apparatus just described, is useful for various purposes. The material deposited in the separator 10 may, for convenience, be termed "Silica Black, Grade A", and is a new product suitable as a pigment for paints, procelain, glass, inks, crayons, shoe blacking, and as an insecticide carrier and also as a carrier of nickel in the catalytic hydrogenation of oils. With reference to the use of the mentioned Grade A as a carrier for nickel in the hydrogenation of oils, it may be stated that fine, air-floated, diatomaceous earth has been used for many years for this purpose, but the mentioned Grade A has advantages over such diatomaceous earth in that it is lighter and has greater adsorptive power.

The material deposited in separator 9 may, for convenience, be termed "Silica Black, Grade B", and is useful as an adsorbent for gases, as a filtering medium for sugar refining and in the clarification of vegetable and mineral oils.

Silica black, Grade C, is the relatively course material in box 5 which is not drawn into the separators 9 and 10, is useful as a filtering medium both for oils and for aqueous solutions and for making brick, mortar, concrete, building blocks and other construction material.

The specific gravities of Grades A, B and C are approximately as follows: Grade A, 0.251; Grade B, 0.663; Grade C, 0.662, representing weights in air divided by the respective volumes of water.

Instead of using diatomaceous or infusorial earth in the above described process, any siliceous material may be used, such for example, as talc, feldspar, clays, ground quartz or pulverized quartz sand, and, in lieu of the bituminous coal, other varieties of coal may be used such, for example, as semi-bituminous or anthracite. Instead of using coal, I may use other forms of carbon, such, for example as charcoal, or I may use any carbonaceous material such, for example, as wood or cellulose, it being understood that I may employ in my process any carbon-containing or carbonaceous material and any silicon-containing or siliceous material. It is also to be understood that, in heating the mixture of carbonaceous and siliceous material, other temperatures than those mentioned (900° to 1100° centigrade) may be successfully employed. Heating above carbonization temperatures but not substantially above 1100° C. is satisfactory.

What is claimed as new and useful is:

1. The process which comprises intimately mixing finely divided carbonaceous and silicious materials in about equal amounts by weight, subjecting the mixture to destructive distillation in a retort excluding air at temperatures above carbonization temperatures but not substantially exceeding 1100° C. and classifying the resulting black product by air floatation into at least two portions, a lighter portion having the properties of a black pigment and a heavier portion being useful as an adsorbent for gases, as a filtering medium and the like.

2. The process of claim 1 wherein the carbonaceous material employed is selected from a class consisting of bituminous coal, semi-bituminous coal, anthracite coal, charcoal, wood and cellulose.

3. The process of claim 1 wherein the siliceous material employed is selected from a class consisting of diatomaceous earth, fuller's earth, talc, feldspar, clays, quartz and sand.

4. The process of claim 1 wherein the gases evolved during the heating step are collected separately.

5. The process of claim 1 wherein the temperatures employed in the destructive distillation step range from about 900° to 1100° C.

6. As a new product, a finely divided, air-floated, soft, black carbonaceous material having an analysis principally $SiO_2$, having a specific gravity of the order of 0.66 and having the characteristics of the heavier of the products produced by the process of claim 1.

7. As a new product, a finely divided, air-floated, soft, black carbonaceous material having an analysis principally $SiO_2$, having a specific gravity of the order of 0.25 and having the characteristics of the lighter of the products produced by the process of claim 1.

CARL ALFRED JACOBSON.